United States Patent
Celik et al.

(10) Patent No.: US 9,438,149 B2
(45) Date of Patent: Sep. 6, 2016

(54) METHOD OF CONTROLLING A BRUSHLESS PERMANENT-MAGNET MOTOR

(71) Applicant: Dyson Technology Limited, Wiltshire (GB)

(72) Inventors: Tuncay Celik, Swindon (GB); Libo Zheng, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 14/304,658

(22) Filed: Jun. 13, 2014

(65) Prior Publication Data
US 2014/0368138 A1  Dec. 18, 2014

(30) Foreign Application Priority Data
Jun. 13, 2013  (GB) .................................. 1310573.9

(51) Int. Cl.
 H02P 1/24  (2006.01)
 H02P 6/14  (2016.01)
 H02P 6/18  (2016.01)

(52) U.S. Cl.
 CPC .................. H02P 6/14 (2013.01); H02P 6/157 (2016.02); H02P 6/182 (2013.01)

(58) Field of Classification Search
 CPC ........ H02P 6/002; H02P 6/142; H02P 6/147; H02P 6/182; H02P 6/18
 See application file for complete search history.

(56) References Cited

U.S. PATENT DOCUMENTS

| | | | |
|---|---|---|---|
| 5,233,275 A | 8/1993 | Danino | |
| 5,506,487 A | 4/1996 | Young et al. | |
| 6,034,493 A | 3/2000 | Boyd et al. | |
| 8,474,095 B2 | 7/2013 | Clothier et al. | |
| 8,836,254 B2 | 9/2014 | Dai et al. | |
| 8,841,876 B2 | 9/2014 | Leaver et al. | |
| 2001/0040438 A1 | 11/2001 | Maurice et al. | |
| 2005/0069301 A1 | 3/2005 | Gallagher et al. | |
| 2008/0048593 A1 | 2/2008 | Takeuchi | |

(Continued)

FOREIGN PATENT DOCUMENTS

| EP | 1 555 738 | 7/2005 |
|---|---|---|
| EP | 2 302 785 | 3/2011 |

(Continued)

OTHER PUBLICATIONS

International Search Report and Written Opinion mailed on Nov. 3, 2014, directed to International Application No. PCT/GB2014/051781; 12 pages.

(Continued)

*Primary Examiner* — Karen Masih
(74) *Attorney, Agent, or Firm* — Morrison & Foerster LLP

(57) ABSTRACT

A method of controlling a brushless permanent-magnet motor. The method includes dividing each half of an electrical cycle of the motor into a conduction period followed by a primary freewheel period. The conduction period is then divided into a first excitation period, a secondary freewheel period, and a second excitation period. The method then involves exciting a winding of the motor during each excitation period and freewheeling the winding during each freewheel period. The secondary freewheel period has a position and length within the conduction period that acts to reduce the harmonic content of current in the winding relative to back EMF in the winding. As a result, the efficiency of the motor is improved.

18 Claims, 6 Drawing Sheets

(56) References Cited

U.S. PATENT DOCUMENTS

| | | | |
|---|---|---|---|
| 2010/0164418 A1 | 7/2010 | Higuchi | |
| 2010/0188037 A1 | 7/2010 | Acquaviva et al. | |
| 2010/0251509 A1 | 10/2010 | Clothier | |
| 2011/0257791 A1 | 10/2011 | Hawker et al. | |
| 2012/0081046 A1 | 4/2012 | Dai et al. | |
| 2013/0127384 A1 | 5/2013 | Dai et al. | |
| 2013/0234640 A1* | 9/2013 | Bateman | H02P 6/182 318/400.35 |
| 2014/0368140 A1 | 12/2014 | Celik | |
| 2014/0368141 A1 | 12/2014 | Zheng et al. | |

FOREIGN PATENT DOCUMENTS

| | | |
|---|---|---|
| GB | 2469138 | 10/2010 |
| GB | 2484779 | 4/2012 |
| GB | 2496867 | 5/2013 |
| GB | 2500013 | 9/2013 |
| JP | 7-322636 | 12/1995 |
| JP | 2002-112577 | 4/2002 |
| JP | 2004-304905 | 10/2004 |
| JP | 2005-143225 | 6/2005 |
| JP | 2010-246385 | 10/2010 |
| JP | 2010-246386 | 10/2010 |
| JP | 2012-80766 | 4/2012 |
| JP | 2012-80768 | 4/2012 |
| JP | 2012-90429 | 5/2012 |
| WO | WO-00/22723 | 4/2000 |

OTHER PUBLICATIONS

Search Report mailed Dec. 5, 2013, directed towards GB Application No. 1310573.9; 1 page.

Celik, U.S. Office Action mailed Oct. 19, 2015, directed to U.S. Appl. No. 14/304,511; 6 pages.

Zheng et al., U.S. Office Action mailed Nov. 12, 2015, directed to U.S. Appl. No. 14/304,599; 6 pages.

* cited by examiner

| Control Signals | | | | Power Switches | | | | Inverter Condition |
|---|---|---|---|---|---|---|---|---|
| S1 | S2 | S3 | S4 | Q1 | Q2 | Q3 | Q4 | |
| 0 | 0 | 0 | 0 | 0 | 0 | 0 | 0 | Off |
| 1 | 0 | 0 | 1 | 1 | 0 | 0 | 1 | Excite Left-to-Right |
| 0 | 1 | 1 | 0 | 0 | 1 | 1 | 0 | Excite Right-to-Left |
| 0 | 1 | 0 | 1 | 0 | 1 | 0 | 1 | Freewheel |

Fig. 3

METHOD OF CONTROLLING A BRUSHLESS PERMANENT-MAGNET MOTOR

REFERENCE TO RELATED APPLICATION

This application claims priority of United Kingdom Application No. 1310573.9, filed Jun. 13, 2013, the entire contents of which are incorporated herein by reference.

FIELD OF THE INVENTION

The present invention relates to a method of controlling a brushless permanent-magnet motor.

BACKGROUND OF THE INVENTION

Efforts are continually being made to improve the efficiency of brushless permanent-magnet motors.

SUMMARY OF THE INVENTION

The present invention provides a method of controlling a brushless permanent-magnet motor, the method comprising dividing each half of an electrical cycle into a conduction period followed by a primary freewheel period, dividing the conduction period into a first excitation period, a secondary freewheel period, and a second excitation period, exciting a winding of the motor during each excitation period, and freewheeling the winding during each freewheel period, wherein the secondary freewheel period has a position and length within the conduction period that reduces the harmonic content of current in the winding relative to back EMF in the winding.

For a permanent-magnet motor, the torque-to-current ratio during excitation is at a maximum when the waveform of the phase current matches that of the back EMF. Accordingly, by employing a secondary freewheel period that reduces the harmonic content of the phase current waveform relative to the back EMF waveform, the efficiency of the motor is improved.

The secondary freewheel period may occur at a time when the back EMF in the winding is rising, and the primary freewheel period may occur at a time when back EMF is principally falling. Upon exciting the phase winding, the phase current may rise at a faster rate than that of the back EMF. As a result, the phase current may lead the back EMF. The secondary freewheel period serves to check momentarily the rise in the phase current. Consequently, the phase current more closely follows the rise of the back EMF during the conduction period. The primary freewheel period makes use of the inductance of the winding such that torque continues to be generated by the phase current without any additional power being drawn from the power supply. As the back EMF falls, less torque is generated for a given phase current. Accordingly, by freewheeling the winding during the period of falling back EMF, the efficiency of the motor may be improved without adversely affecting the torque.

The length of the secondary freewheel period may be less than each of the primary freewheel period, the first excitation period and the second excitation period. Consequently, the secondary freewheel period acts to check momentarily the rise of the phase current without adversely affecting the power of the motor.

The method may comprise exciting the winding with a supply voltage, and varying the length of the conduction period in response to changes in the supply voltage and/or the speed of the motor. As a result, better control may be achieved over the power of the motor.

As the supply voltage decreases, less current and thus less power are driven into the motor over the same conduction period. Equally, as the speed of the motor increases, the magnitude of the back EMF induced in the winding increases. Less current and thus less power are then driven into the motor over the same conduction period. Accordingly, in order to compensate for this, the method may comprise increasing the conduction period in response to a decrease in the supply voltage and/or an increase in the speed of the motor.

The first excitation period and the second excitation period may have the same length. This then has at least two advantages. First, the harmonic content of the phase current is better balanced over the two excitation periods. As a result, the total harmonic content of the phase current during the conduction period is likely to be lower than if the two excitation periods were of different lengths. Second, when implementing the method in hardware, the hardware need only store a single excitation period, which can then be used to define both excitation periods. Alternatively, where the method comprises varying the length of the conduction period in response to changes in the supply voltage and/or the motor speed, the hardware need only store a single excitation period for each voltage and/or speed point. As a result, less memory is required to store the excitation period(s).

The length of the secondary freewheel period may be fixed. This then has the advantage that, when implementing the method in hardware, the hardware need only store a single secondary freewheel period. In spite of this advantage, the method may nevertheless comprise exciting the winding with a supply voltage, and varying the secondary freewheel period in response to changes in the supply voltage and/or the speed of the motor. In particular, the method may comprise increasing the length of the secondary freewheel period in response to an increase in the supply voltage or a decrease in the speed of the motor. As the supply voltage increases, current in the phase winding rises at a faster rate during excitation. As a result, the harmonic content of the phase current waveform relative to the back EMF waveform is likely to increase. By increasing the length of the secondary freewheel period in response to an increase in the supply voltage, the rise in the phase current is checked for a longer period and thus the harmonic content of the phase current waveform may be reduced. As the speed of the motor decreases, the back EMF rises at a slower rate. Additionally, the magnitude of the back EMF decreases and thus current in the phase winding rises at a faster rate during excitation. The back EMF therefore rises at a slower rate whilst the phase current rises at a faster rate. As a result, the harmonic content of the phase current waveform relative to the back EMF waveform is likely to increase. By increasing the secondary freewheel period in response to a decrease in the speed of the motor, the rise in the phase current is checked for a longer period and thus the harmonic content of the phase current waveform may be reduced. Accordingly, increasing the secondary freewheel period in response to an increase in the supply voltage and/or a decrease in the speed of the motor may result in further improvements in efficiency.

The present invention also provides a method of controlling a brushless permanent-magnet motor, the method comprising operating in dual-switch mode over a first speed range and operating in single-switch mode over a second speed range, wherein the second speed range is higher than the first speed range, each mode comprises dividing each half of an electrical cycle into a conduction period followed by a primary freewheel period, the single-switch mode comprises exciting a winding of the motor during the conduction period and freewheeling the winding during the freewheel period, and dual-switch mode comprises dividing the conduction period into a first excitation period, a secondary freewheel period and a second excitation period, exciting the winding during each excitation period, and freewheeling the winding during each freewheel period.

When operating over the first speed range, the length of each electrical half-cycle is longer and thus the back EMF rises at a slower rate. Additionally, the magnitude of the back EMF is lower and thus the phase current rises at a faster rate. The back EMF therefore rises at a slower rate but the phase current rises at a faster rate. As a result, the phase current may rise at a faster rate than that of the back EMF during excitation. By introducing the secondary freewheel period, the rise in the phase current is checked momentarily such that the rise in the phase current more closely follows the rise in the back EMF. As a result, the harmonic content of the phase current waveform relative to the back EMF waveform is reduced and thus the efficiency of the motor is increased. When operating over the second speed range, the length of each electrical half-cycle is shorter and thus the back EMF rises at a faster rate. Additionally, the magnitude of the back EMF is higher and thus the phase current rises at a slower rate. The back EMF therefore rises at a faster rate but the phase current rises at a slower rate. As a result, the phase current may rise at a rate that is similar to or slower than that of the back EMF during excitation. A secondary freewheel period would then serve only to increase the harmonic content of the phase current relative to the back EMF. Accordingly, by employing dual-switch mode at lower speeds and single-switch mode at higher speeds, the efficiency of the motor may be improved over both speed ranges.

Each mode may comprise exciting the winding with a supply voltage, and varying the length of the conduction period in response to changes in the supply voltage or the speed of the motor. As a result, better control may be achieved over the power of the motor. For reasons noted above, the method may comprise increasing the conduction period in response to a decrease in the supply voltage and/or an increase in the speed of the motor.

The present invention further provides a method of controlling a brushless permanent-magnet motor, the method comprising operating in multi-switch mode over a first speed range and operating in dual-switch mode over a second speed range, wherein the second speed range is higher than the first speed range, multi-switch mode comprises sequentially exciting and freewheeling a winding of the motor multiple times during each half of an electrical cycle, the winding being freewheeled when current in the winding exceeds a predefined limit, and dual-switch mode comprises dividing each half of an electrical cycle into a conduction period followed by a primary freewheel period, dividing the conduction period into a first excitation period, a secondary freewheel period and a second excitation period, exciting the winding during each excitation period, and freewheeling the winding during each freewheel period.

When operating over the first speed range, the length of each electrical half-cycle is relatively long and thus the rate at which the back EMF rises is relatively slow. Additionally, the magnitude of the back EMF is relatively low and thus the rate at which the phase current rises is relatively fast. Consequently, when operating over the first speed range, the phase current rises at a much faster rate than that of the back EMF. The phase winding is therefore freewheeled whenever the phase current exceeds a predefined limit. This then protects the hardware used to implement the method from excessive phase currents. As the speed of the motor increases, the length of each electrical half-cycle decreases and thus the back EMF rises at faster rate. Additionally, the magnitude of the back EMF increases and thus the phase current rises at a slower rate. When operating over the second speed range, the phase current does not exceed the predefined limit. The phase current nevertheless rises at a faster rate than that of the back EMF during excitation. By introducing the secondary freewheel period, the rise in the phase current is checked momentarily such that the rise in the phase current more closely follows the rise in the back EMF. As a result, the efficiency of the motor is improved. Accordingly, by employing multi-switch mode at lower speeds and dual-switch mode at higher speeds, the hardware may be protected from excessive phase currents at lower speeds whilst the efficiency of the motor may be improved at higher speeds.

The present invention further provides a control circuit configured to perform a method as described in any one of the preceding paragraphs, as well as a motor assembly comprising a brushless permanent-magnet motor and the control circuit.

The control circuit may comprise an inverter for coupling to a winding of the motor, a gate driver module and a controller. The gate driver module then controls switches of the inverter in response to control signals received from the controller. The controller is responsible for dividing each half of an electrical cycle into the conduction period and the primary freewheel period, and for dividing the conduction period into the first excitation period, the secondary freewheel period, and the second excitation period. The controller then generates control signals to excite the winding during each excitation period and to freewheel the winding during each freewheel period.

BRIEF DESCRIPTION OF THE DRAWINGS

In order that the present invention may be more readily understood, an embodiment of the invention will now be described, by way of example, with reference to the accompanying drawings, in which:

FIG. 3 details the allowed states of the inverter in response to control signals issued by the controller of the motor assembly;

DETAILED DESCRIPTION OF THE INVENTION

Figure 1:
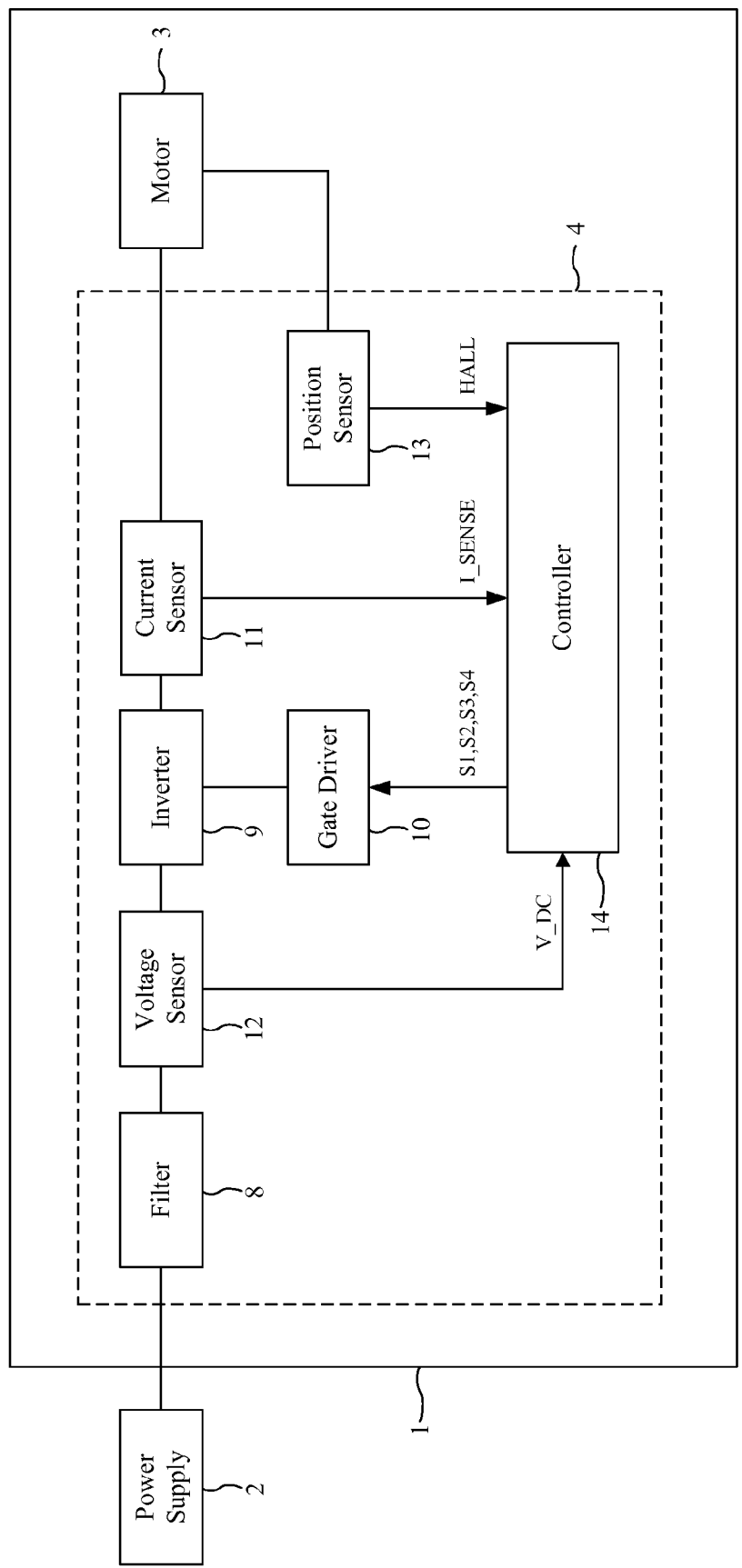
FIG. 1 is a block diagram of a motor assembly in accordance with the present invention.
Figure 2:
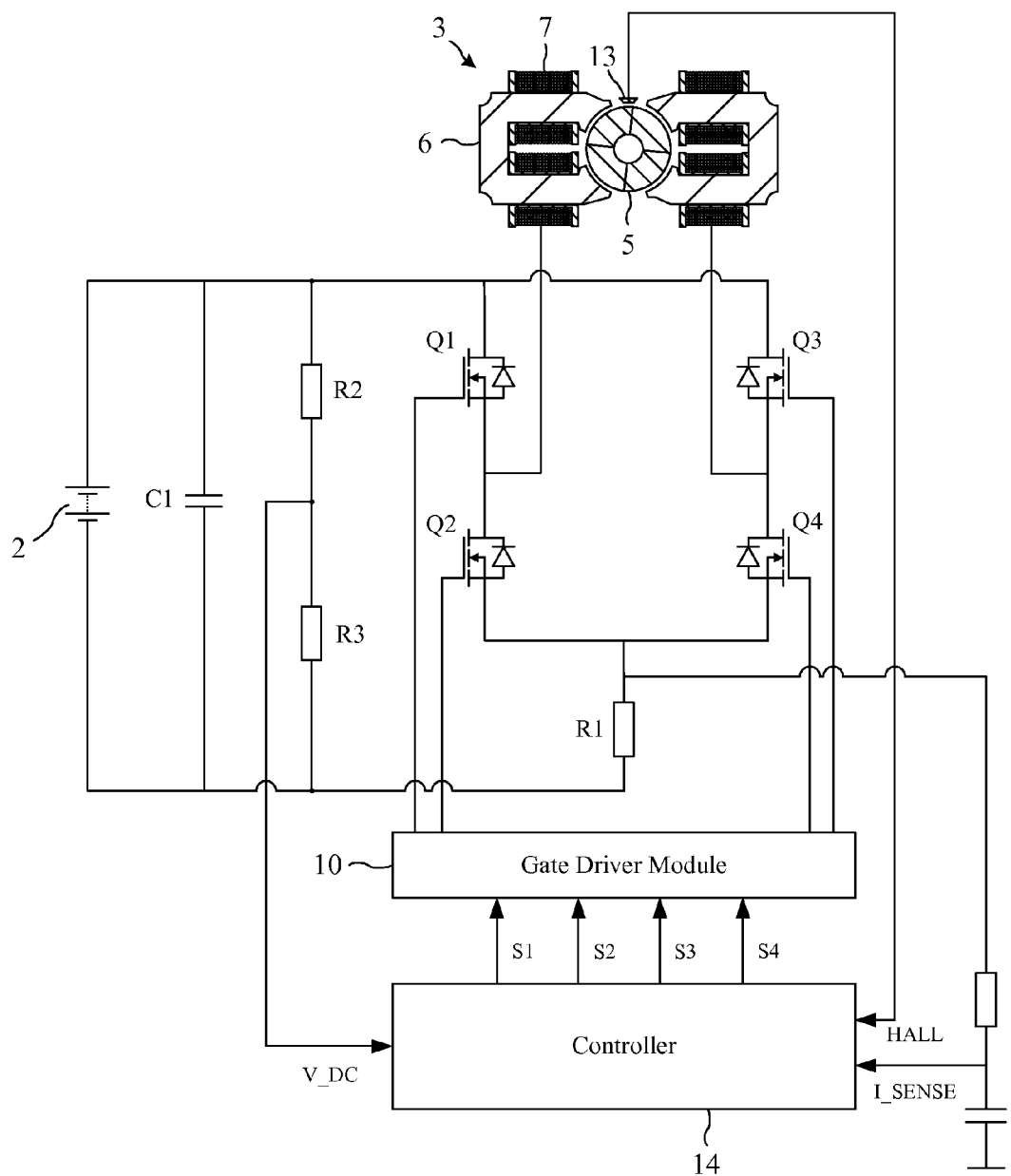
FIG. 2 is a schematic diagram of the motor assembly.

The motor assembly 1 of FIGS. 1 and 2 is powered by a DC power supply 2 and comprises a brushless motor 3 and a control circuit 4.

The motor 3 comprises a four-pole permanent-magnet rotor 5 that rotates relative to a four-pole stator 6. Conductive wires wound about the stator 6 are coupled together to form a single phase winding 7.

The control circuit 4 comprises a filter 8, an inverter 9, a gate driver module 10, a current sensor 11, a voltage sensor 12, a position sensor 13, and a controller 14.

The filter 8 comprises a link capacitor C1 that smoothes the relatively high-frequency ripple that arises from switching of the inverter 9.

The inverter 9 comprises a full bridge of four power switches Q1-Q4 that couple the phase winding 7 to the voltage rails. Each of the switches Q1-Q4 includes a freewheel diode.

The gate driver module 10 drives the opening and closing of the switches Q1-Q4 in response to control signals received from the controller 14.

The current sensor 11 comprises a shunt resistor R1 located between the inverter and the zero-volt rail. The voltage across the current sensor 11 provides a measure of the current in the phase winding 7 when connected to the power supply 2. The voltage across the current sensor 11 is output to the controller 14 as signal, I_PHASE.

The voltage sensor 12 comprises a potential divider R2,R3 located between the DC voltage rail and the zero volt rail. The voltage sensor outputs a signal, V_DC, to the controller 14 that represents a scaled-down measure of the supply voltage provided by the power supply 2.

The position sensor 13 comprises a Hall-effect sensor located in a slot opening of the stator 6. The sensor 13 outputs a digital signal, HALL, that is logically high or low depending on the direction of magnetic flux through the sensor 13. The HALL signal therefore provides a measure of the angular position of the rotor 5.

The controller 14 comprises a microcontroller having a processor, a memory device, and a plurality of peripherals (e.g. ADC, comparators, timers etc.). The memory device stores instructions for execution by the processor, as well as control parameters and lookup tables that are employed by the processor during operation. The controller 14 is responsible for controlling the operation of the motor 3 and generates four control signals S1-S4 for controlling each of the four power switches Q1-Q4. The control signals are output to the gate driver module 10, which in response drives the opening and closing of the switches Q1-Q4.

FIG. 3 summarises the allowed states of the switches Q1-Q4 in response to the control signals S1-S4 output by the controller 14. Hereafter, the terms 'set' and 'clear' will be used to indicate that a signal has been pulled logically high and low respectively. As can be seen from FIG. 3, the controller 14 sets S1 and S4, and clears S2 and S3 in order to excite the phase winding 7 from left to right. Conversely, the controller 14 sets S2 and S3, and clears S1 and S4 in order to excite the phase winding 7 from right to left. The controller 14 clears S1 and S3, and sets S2 and S4 in order to freewheel the phase winding 7. Freewheeling enables current in phase the winding 7 to re-circulate around the low-side loop of the inverter 9. In the present embodiment, the power switches Q1-Q4 are capable of conducting in both directions. Accordingly, the controller 14 closes both low-side switches Q2,Q4 during freewheeling such that current flows through the switches Q2,Q4 rather than the less efficient diodes. Conceivably, the inverter 9 may comprise power switches that conduct in a single direction only. In this instance, the controller 14 would clear S1, S2 and S3, and set S4 so as to freewheel the phase winding 7 from left to right. The controller 14 would then clear S1, S3 and S4, and set S2 in order to freewheel the phase winding 7 from right to left. Current in the low-side loop of the inverter 9 then flows down through the closed low-side switch (e.g. Q4) and up through the diode of the open low-side switch (e.g. Q2).

The controller 14 operates in one of three modes depending on the speed of the rotor 5. At speeds below a first threshold, the controller 14 operates in multi-switch mode. At speeds above the first threshold but below a second threshold, the controller 14 operates in dual-switch mode. And at speeds above the third speed threshold, the controller 14 operates in single-switch mode. The speed of the rotor 5 is determined from the interval between successive edges of the HALL signal, which will hereafter be referred to as the HALL period.

Multi-switch mode is employed during acceleration of the motor 3 whilst dual-switch mode and single-switch mode are employed during steady state. A description of each mode is provided below. Dual-switch mode involves a small but significant change to single-switch mode. Accordingly, in order that the nature and the significance of the change may be better appreciated, a description of single-switch mode will be provided before that of dual-switch mode.

In all three modes the controller 14 commutates the phase winding 7 in response to edges of the HALL signal. Each HALL edge corresponds to a change in the polarity of the rotor 5, and thus a change in the polarity of the back EMF induced in the phase winding 7. More particularly, each HALL edge corresponds to a zero-crossing in the back EMF. Commutation involves reversing the direction of current through the phase winding 7. Consequently, if current is flowing through the phase winding 7 in a direction from left to right, commutation involves exiting the winding from right to left.

In order to simplify the present discussion, it will be assumed that the controller 14 commutates the phase winding 7 in synchrony with the HALL edges, i.e. in synchrony with the zero-crossings in the back EMF. In reality, however, the controller 14 may advance, synchronise or retard commutation relative to the HALL edges.

Multi-Switch Mode

When operating in multi-switch mode, the controller 14 sequentially excites and freewheels the phase winding 7 over each half of an electrical cycle. More particularly, the controller 14 excites the phase winding 7, monitors the current signal, I_PHASE, and freewheels the phase winding 7 when the current in the phase winding 7 exceeds a predefined limit. Freewheeling then continues for a predefined freewheel period during which time current in the phase winding 7 falls to a level below the current limit. At the end of the freewheel period the controller 14 again excites the phase winding 7. This process of exciting and freewheeling the phase winding 7 continues over the full length of the electrical half-cycle. The controller 14 therefore switches from excitation to freewheeling multiple times during each electrical half-cycle.

Figure 4:
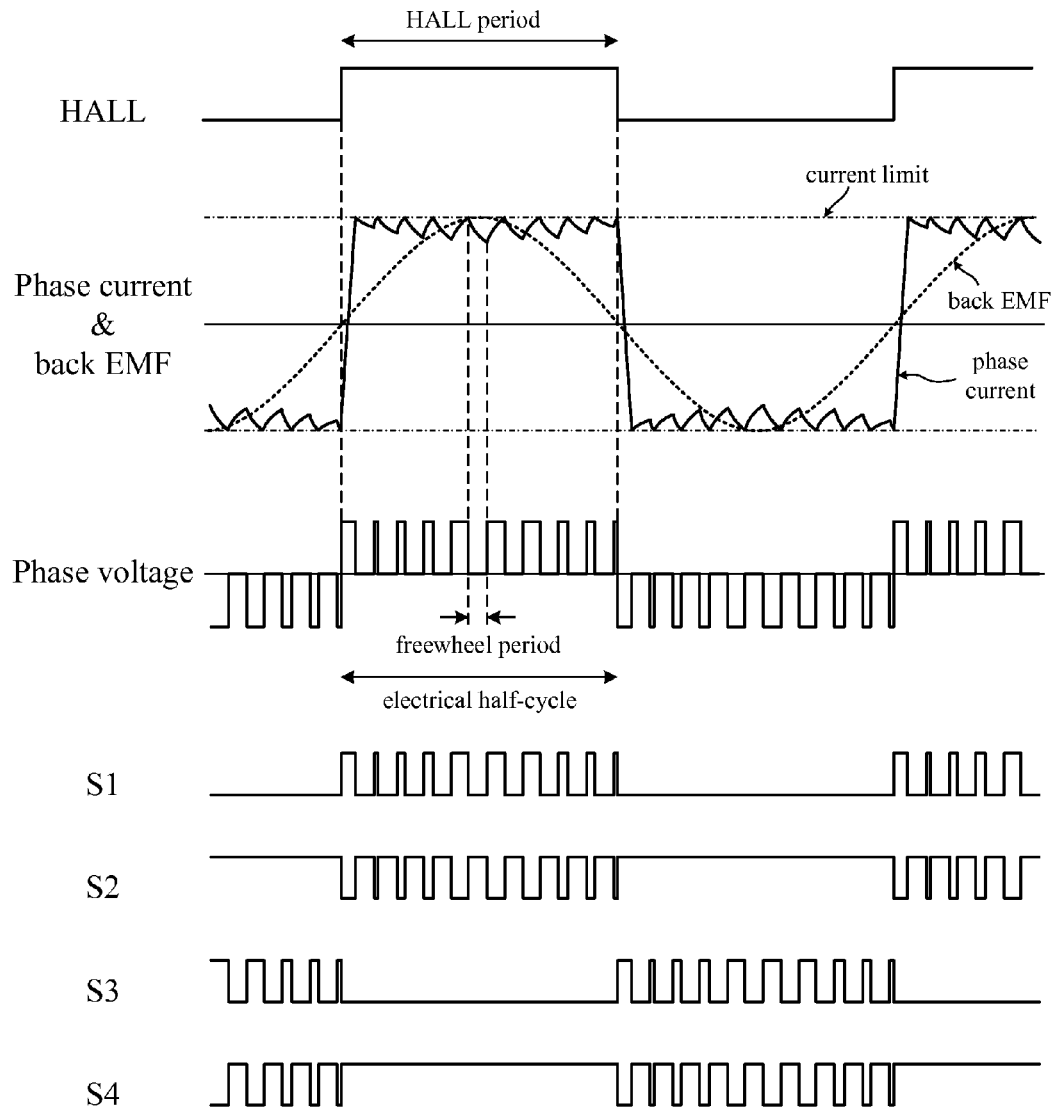
FIG. 4 illustrates various waveforms of the motor assembly when operating in multi-switch mode.

FIG. 4 illustrates the waveforms of the HALL signal, the back EMF, the phase current, the phase voltage, and the control signals over a couple of HALL periods when operating in multi-switch mode.

At relatively low speeds, the magnitude of the back EMF induced in the phase winding 7 is relatively small. Current in the phase winding 7 therefore rises relatively quickly during excitation, and falls relatively slowly during freewheeling. Additionally, the length of each HALL period and thus the length of each electrical half-cycle is relatively long. Consequently, the frequency at which the controller 14 switches from excitation to freewheeling is relatively high. However, as the rotor speed increases, the magnitude of the back EMF increases and thus current rises at a slower rate during excitation and falls at a quicker rate during freewheeling. Additionally, the length of each electrical half-cycle decreases. As a result, the frequency of switching decreases.

Single-Switch Mode

When operating in single-switch mode, the controller 14 divides each half of an electrical cycle into a conduction period followed by a freewheel period. The controller 14 then excites the phase winding 7 during the conduction period and freewheels the phase winding 7 during the freewheel period. When operating within single-switch mode, the phase current does not exceed the current limit during excitation. Consequently, the controller 14 switches from excitation to freewheeling only once during each electrical half-cycle.

Figure 5:
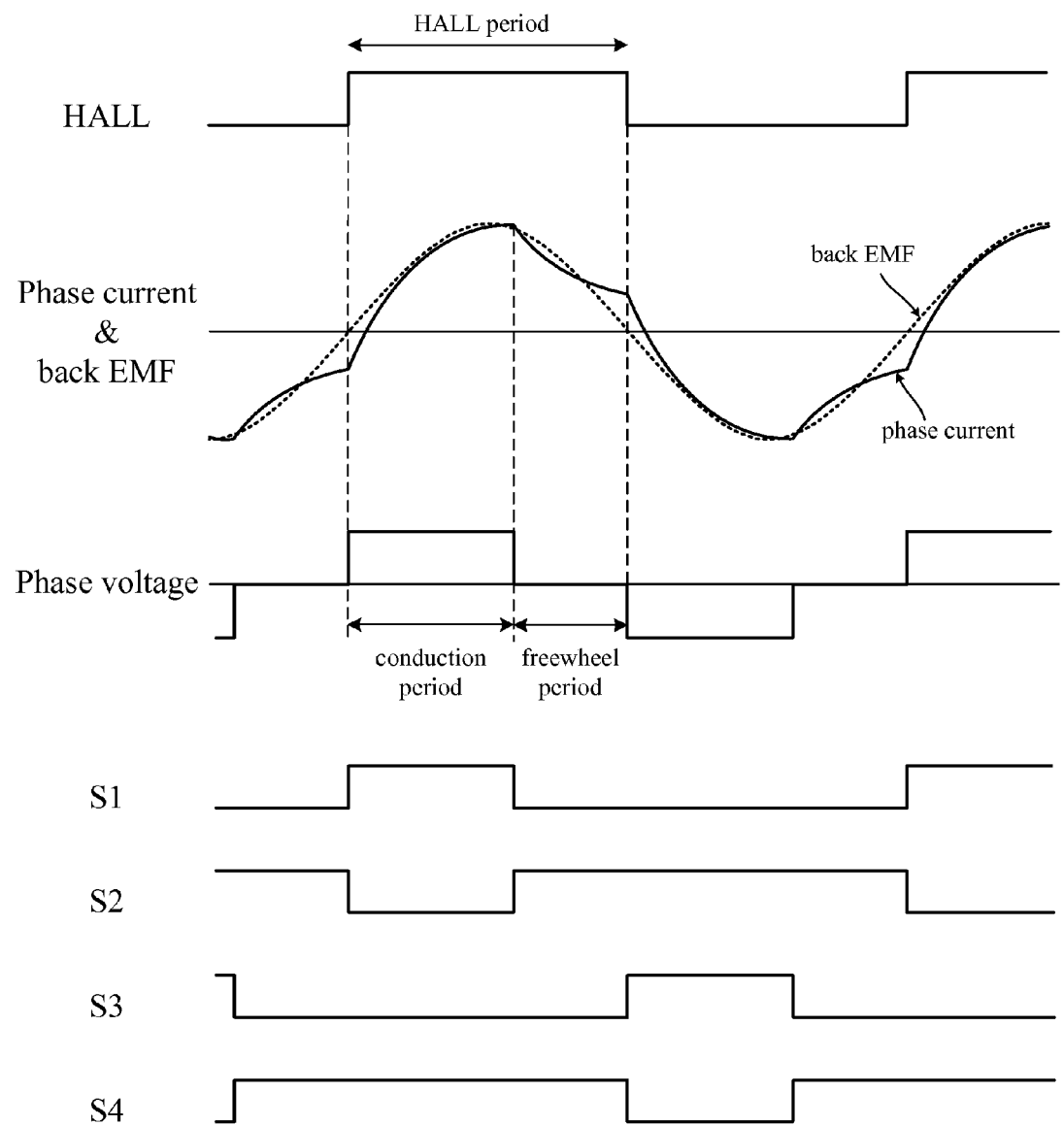
FIG. 5 illustrates various waveforms of the motor assembly when operating in single-switch mode.

FIG. 5 illustrates the waveforms of the HALL signal, the back EMF, the phase current, the phase voltage, and the control signals over a couple of HALL periods when operating in single-switch mode.

The magnitude of the supply voltage used to excite the phase winding 7 may vary. For example, the power supply 2 may comprise a battery that discharges with use. Alternatively, the power supply 2 may comprise an AC source, rectifier and smoothing capacitor that provide a relatively smooth voltage, but the RMS voltage of the AC source may vary. Changes in the magnitude of the supply voltage will influence the amount of current that is driven into the phase winding 7 during the conduction period. As a result, the power of the motor 3 is sensitive to changes in the supply voltage. In addition to the supply voltage, the power of the motor 3 is sensitive to changes in the speed of the rotor 5. As the speed of the rotor 5 varies (e.g. in response to changes in load), so too does the magnitude of the back EMF. Consequently, the amount of current driven into the phase winding 7 during the conduction period may vary. The controller 14 therefore varies the length of the conduction period in response to changes in the speed of the rotor 5 and/or the magnitude of the supply voltage. As a result, the controller 14 is better able to control the power of the motor 3 in response to changes in the rotor speed and/or the supply voltage.

In order to vary the length of the conduction period, the controller 14 stores a lookup table of different conduction periods for different voltages and/or speeds. The controller 14 then indexes the lookup table (e.g. in response to each or every nth HALL edge) using the supply voltage and/or the rotor speed to select a conduction period. The speed of the rotor 5 is obtained from the length of the HALL period, whilst the supply voltage is obtained from the V_DC signal.

The lookup table stores conduction periods that achieve a particular output power at each voltage and/or speed point. As the supply voltage decreases, less current and thus less power are driven into the motor 3 over the same conduction period. Similarly, as the rotor speed increases, the magnitude of the back EMF increases. Accordingly, less current and thus less power is driven into the motor 3 over the same conduction period. Accordingly, in order to compensate for this behaviour, the controller 14 may employ a conduction period that increases in response to a decrease in the supply voltage or an increase in the rotor speed.

Dual-Switch Mode

During excitation of the phase winding, the torque-to-current ratio is at a maximum when the waveform of the phase current matches that of the back EMF. Improvements in the efficiency of the motor 3 are therefore achieved by shaping the waveform of the phase current such that it better matches the waveform of the back EMF, i.e. by reducing the harmonic content of the phase current waveform relative to the back EMF waveform. The applicant has found that, when operating at lower speeds within single-switch mode, an improvement in the efficiency of the motor 3 is achieved by inserting a relatively small secondary freewheel period into the conduction period.

At lower rotor speeds, the length of the HALL period is longer and thus the back EMF rises at a slower rate. Additionally, the magnitude of the back EMF is lower and thus, assuming the supply voltage is unchanged, current in the phase winding rises at a faster rate. Consequently, at lower speeds, the back EMF rises at a slower rate but the phase current rises at a faster rate. As a result, the phase current rises at a faster rate than that of the back EMF during the early part of the conduction period. The applicant has found that, by introducing a relatively small secondary freewheel period during the conduction period, the rise in the phase current is checked momentarily such that the rise in the phase current more closely follows the rise in the back EMF. As a result, the harmonic content of the phase current waveform relative to the back EMF waveform is reduced and thus the efficiency of the motor 3 is increased.

When operating in dual-switch mode, the controller 14 divides each half of an electrical cycle into a conduction period followed by a primary freewheel period. The controller 14 then divides the conduction period into a first excitation period, followed by a secondary freewheel period, followed by a second excitation period. The controller 14 then excites the phase winding 7 during each of the two excitation periods and freewheels the phase winding 7 during each of the two freewheel periods. As in single-switch mode, the phase current does not exceed the current limit during excitation. Accordingly, the controller 14 switches from excitation to freewheeling twice during each electrical half-cycle.

Figure 6:
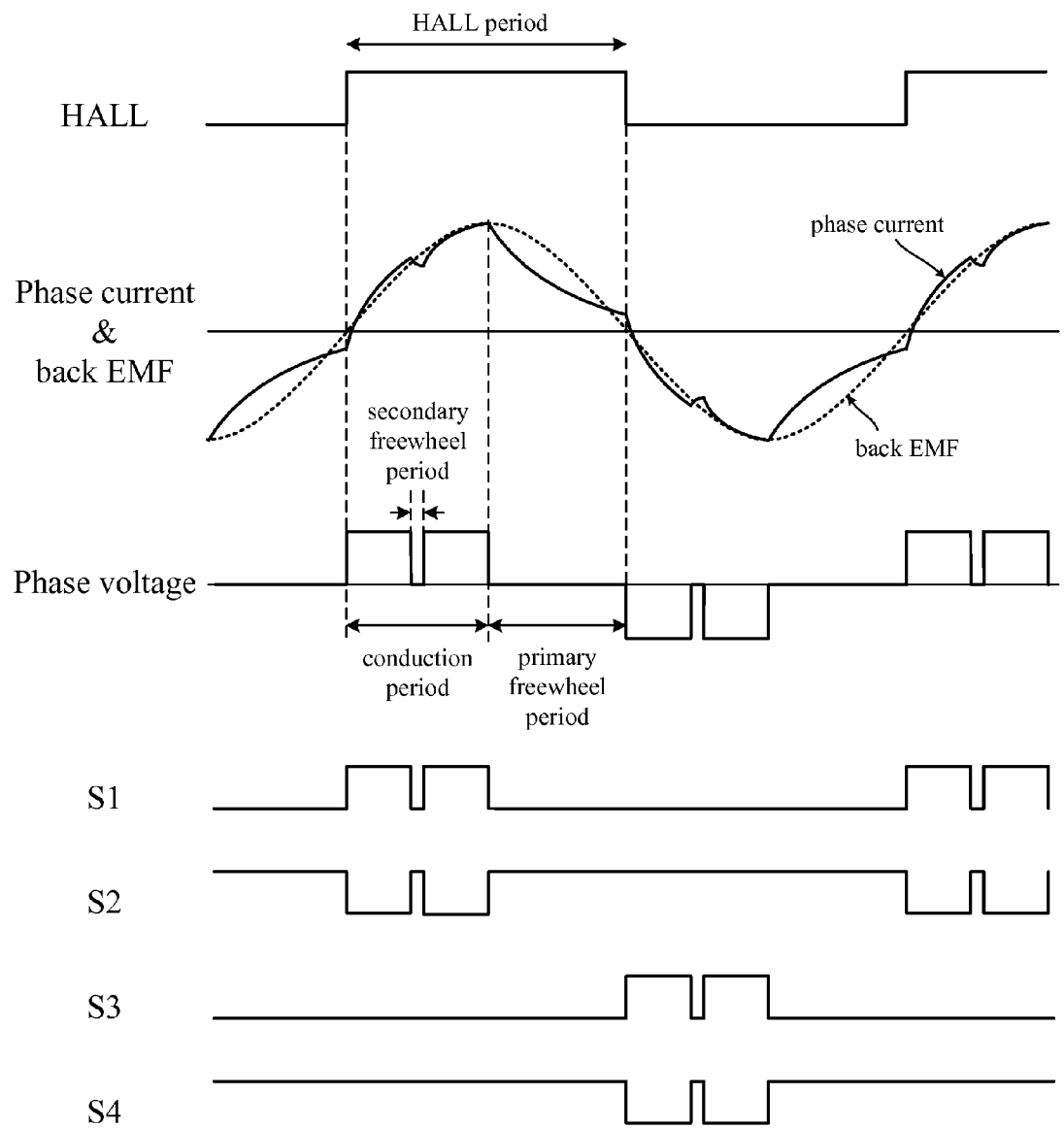
FIG. 6 illustrates various waveforms of the motor assembly when operating in dual-switch mode.

FIG. 6 illustrates the waveforms of the HALL signal, the back EMF, the phase current, the phase voltage, and the control signals over a couple of HALL periods when operating in dual-switch mode.

The controller 14 operates in dual-switch mode at lower speeds where conventionally the controller 14 would operate in single-switch mode. As in single-switch mode, the controller 14 varies the length of the conduction period in response to changes in the magnitude of the supply voltage and/or the speed of the rotor 5. To this end, the controller 14 stores a lookup table of different excitation periods for different voltages and/or speeds. The controller 14 then indexes the lookup table using the supply voltage and/or the rotor speed to select an excitation period. The selected excitation period is then used to define both the first excitation period and the second excitation period, i.e. the controller 14 excites the phase winding 7 for the selected excitation period, freewheels the phase winding 7 for the secondary freewheel period, and excites the phase winding 7 again for the selected excitation period.

Since the first excitation period and the second excitation period are of the same length, the secondary freewheel period occurs at the centre of the conduction period. This has at least two advantages. First, the harmonic content of the phase current is better balanced over the two excitation periods. As a result, the total harmonic content of the phase current over the conduction period is likely to be lower than if the two excitation periods were of different lengths. Second, the lookup table need only store one excitation period for each voltage and/or speed point. As a result, less memory is required for the lookup table and thus a cheaper controller may be used. In spite of the aforementioned advantages, it may be desirable to alter the position of the secondary freewheel period in response to changes in the supply voltage and/or the rotor speed. This may be achieved by employing a lookup table that stores a first excitation period and a second excitation period for each voltage and/or speed point.

The controller 14 employs a secondary freewheel period that is fixed in length. This then has the advantage of reducing the memory requirements of the controller 14, i.e. the controller 14 need only store a single secondary freewheel period. Alternatively, however, the controller 14 might employ a secondary freewheel period that varies in response to changes in the supply voltage and/or the rotor speed. In particular, the controller 14 may employ a secondary freewheel period that increases in response to an increase in the supply voltage or a decrease in the rotor speed. As the supply voltage increases, current in the phase winding 7 rises at a faster rate during excitation, assuming that the rotor speed and thus the magnitude of the back EMF are unchanged. As a result, the harmonic content of the phase current waveform relative to the back EMF waveform is likely to increase. By increasing the length of the secondary freewheel period in response to an increase in the supply voltage, the rise in the phase current is checked for a longer period and thus the harmonic content of the phase current waveform may be reduced. As the rotor speed decreases, the length of the HALL period increases and thus the back EMF rises at a slower rate. Additionally, the magnitude of the back EMF decreases and thus current in the phase winding 7 rises at a faster rate, assuming that the supply voltage is unchanged. Consequently, as the rotor speed decreases, the back EMF rises at a slower rate but the phase current rises at a faster rate. The harmonic content of the phase current waveform relative to the back EMF waveform is therefore likely to increase. By increasing the secondary freewheel period in response to a decrease in the rotor speed, the rise in the phase current is checked for a longer period and thus the harmonic content of the phase current waveform may be reduced. Accordingly, increasing the secondary freewheel period in response to an increase in the supply voltage and/or a decrease in the rotor speed may result in further improvements in efficiency.

The length of the secondary freewheel period is relatively short and is intended only to check momentarily the rise in the phase current. Accordingly, the secondary freewheel period is shorter than both the primary freewheel period and each of the excitation periods. The actual length of the secondary freewheel period will depend upon the particular characteristics of the motor assembly 1, e.g. the inductance of the phase winding 7, the magnitude of the supply voltage, the magnitude of the back EMF etc. Irrespective of the length, the secondary freewheel period occurs during a period of rising back EMF in the phase winding 7. This is contrast to the primary freewheel period, which occurs principally if not wholly during a period of falling back EMF. The primary freewheel period makes use of the inductance of the phase winding 7 such that torque continues to be generated by the phase current without any additional power being drawn from the power supply 2. As the back EMF falls, less torque is generated for a given phase current. Accordingly, by freewheeling the phase winding 7 during the period of falling back EMF, the efficiency of the motor 3 may be improved without adversely affecting the torque.

In the embodiment described above, the controller 14 operates in two different modes during steady state. Dual-switch mode is employed when operating over a first speed range, and single-switch mode is employed when operating over a second, higher speed range. This then improves the efficiency of the motor 3 over the full range of speeds within steady state. If the secondary freewheel period were employed when operating at the higher speed range then the efficiency of the motor 3 would worsen, at least in the present embodiment. This is because, when operating at the higher speed range, the phase current generally rises at a rate that is similar to or slower than that of the back EMF. Accordingly, the introduction of a secondary freewheel period would only serve to increase the harmonic content of the phase current relative to the back EMF.

In spite of the comments made in the previous paragraph, dual-switch mode could conceivably be used at higher speeds as well as lower speeds. For example, the inductance of the phase winding 7 may be relatively low such that, even when operating at relatively high speeds, the time constant (L/R) associated with the phase inductance is particularly short in comparison to the length of the HALL period. As a result, the phase current rises relatively quickly in comparison to the back EMF. Alternatively, perhaps the magnitude of the supply voltage relative to the back EMF at higher speeds is relatively high such that the phase current rises relatively quickly in comparison to the back EMF. In both these instances, improvements in efficiency may be achieved by employing dual-switch mode at higher speeds as well as at lower speeds.

In the embodiment described above, the controller 14 stores a lookup table of conduction periods for use in single-switch mode and excitation periods for use in dual-switch mode. The primary freewheel period can then be calculated by subtracting the conduction period from the HALL period. Alternatively, if the phase winding 7 is commutated in synchrony with each HALL edge, primary freewheeling may continue indefinitely until the next HALL edge is sensed by the controller 14. Although the controller 14 stores a lookup table of conduction periods and excitation periods, it will be appreciated that the same level of control may be achieved by different means. For example, rather than storing a lookup table of conduction periods and excitation periods, the controller 14 could store a lookup table of primary freewheel periods, which is likewise indexed using the magnitude of the supply voltage and/or the speed of the rotor 5. The conduction period would then be obtained by subtracting the primary freewheel period from the HALL period, and each excitation period would be obtained by subtracting the primary and the secondary freewheel periods from the HALL period and dividing the result by two:

$$T\_CD = T\_HALL - T\_FW\_1$$

$$T\_EXC = (T\_HALL - T\_FW\_1 - T\_FW\_2)/2$$

where T_CD is the conduction period, T_EXC is each of the first and second excitation periods, T_HALL is the HALL period, T_FW_1 is the primary freewheel period, and T_FW_2 is the secondary freewheel period.

The invention claimed is:

1. A method of controlling a brushless permanent-magnet motor, the method comprising: dividing each half of an electrical cycle of the motor into a conduction period followed by a primary freewheel period; dividing the conduction period into a first excitation period, a secondary freewheel period, and a second excitation period; exciting a winding of the motor during each excitation period; and freewheeling the winding during each freewheel period, wherein the secondary freewheel period has a position and length within the conduction period that reduces the harmonic content of current in the winding relative to back EMF in the winding.

2. The method of claim 1, wherein the secondary freewheel period occurs at a time when back EMF in the winding is rising, and the primary freewheel period occurs at a time when back EMF is principally falling.

3. The method of claim 1, wherein the length of the secondary freewheel period is less than each of the primary freewheel period, the first excitation period and the second excitation period.

4. The method of claim 1, wherein the method comprises exciting the winding with a supply voltage, and varying the length of the conduction period in response to changes in the supply voltage or the speed of the motor.

5. The method of claim 4, wherein the method comprises increasing the length of the conduction period in response to a decrease in the supply voltage or an increase in the speed of the motor.

6. The method of claim 1, wherein the first excitation period and the second excitation period have the same length.

7. The method of claim 1, wherein the length of the secondary freewheel period is fixed.

8. The method of claim 1, wherein the method comprises exciting the winding with a supply voltage, and varying the secondary freewheel period in response to changes in the supply voltage or the speed of the motor.

9. The method of claim 8, wherein the method comprises increasing the length of the secondary freewheel period in response to an increase in the supply voltage or a decrease in the speed of the motor.

10. A method of controlling a brushless permanent-magnet motor, the method comprising operating in dual-switch mode over a first speed range and operating in single-switch mode over a second speed range, wherein the second speed range is higher than the first speed range, each mode comprises dividing each half of an electrical cycle of the motor into a conduction period followed by a primary freewheel period, the single-switch mode comprises exciting a winding of the motor during the conduction period and freewheeling the winding during the freewheel period, and dual-switch mode comprises: dividing the conduction period into a first excitation period, a secondary freewheel period and a second excitation period; exciting the winding during each excitation period; and freewheeling the winding during each freewheel period.

11. The method of claim 10, wherein each mode comprises exciting the winding with a supply voltage, and varying the length of the conduction period in response to changes in the supply voltage or the speed of the motor.

12. A method of controlling a brushless permanent-magnet motor, the method comprising operating in multi-switch mode over a first speed range and operating in dual-switch mode over a second speed range, wherein the second speed range is higher than the first speed range, multi-switch mode comprises sequentially exciting and freewheeling a winding of the motor multiple times during each half of an electrical cycle of the motor, the winding being freewheeled when current in the winding exceeds a predefined limit, and dual-switch mode comprises: dividing each half of an electrical cycle of the motor into a conduction period followed by a primary freewheel period; dividing the conduction period into a first excitation period, a secondary freewheel period and a second excitation period; exciting the winding during each excitation period; and freewheeling the winding during each freewheel period.

13. A control circuit electrically connected to a brushless permanent-magnet motor, the control circuit being configured to: divide each half of an electrical cycle of the motor into a conduction period followed by a primary freewheel period; divide the conduction period into a first excitation period, a secondary freewheel period, and a second excitation period; excite a winding of the motor during each excitation period; and freewheel the winding during each freewheel period, wherein the secondary freewheel period has a position and length within the conduction period that reduces the harmonic content of current in the winding relative to back EMF in the winding.

14. The control circuit of claim 13, wherein the control circuit is included in a motor assembly for the brushless permanent-magnet motor.

15. A control circuit electrically connected to a brushless permanent-magnet motor, the control circuit being configured to operate in dual-switch mode over a first speed range and operate in single-switch mode over a second speed range, the second speed range being higher than the first speed range, wherein when operating in each mode the control circuit divides each half of an electrical cycle of the motor into a conduction period followed by a primary freewheel period, when operating in single-switch mode the control circuit excites a winding of the motor during the conduction period and freewheels the winding during the freewheel period, and when operating in dual-switch mode the control circuit: divides the conduction period into a first excitation period, a secondary freewheel period and a second excitation period; excites the winding during each excitation period; and freewheels the winding during each freewheel period.

16. The control circuit of claim 15, wherein the control circuit is included in a motor assembly for the brushless permanent-magnet motor.

17. A control circuit electrically connected to a brushless permanent-magnet motor, the control circuit being configured to operate in multi-switch mode over a first speed range and operate in dual-switch mode over a second speed range, the second speed range being higher than the first speed range, wherein when operating in multi-switch mode the control circuit sequentially excites and freewheels a winding of the motor multiple times during each half of an electrical cycle of the motor, the winding being freewheeled when current in the winding exceeds a predefined limit, and when operating in dual-switch mode the control circuit: divides each half of an electrical cycle of the motor into a conduction period followed by a primary freewheel period; divides the conduction period into a first excitation period, a secondary freewheel period and a second excitation period; excites the winding during each excitation period; and freewheels the winding during each freewheel period.

18. The control circuit of claim 17, wherein the control circuit is included in a motor assembly for the brushless permanent-magnet motor.

* * * * *